(12) United States Patent
Yamada et al.

(10) Patent No.: US 8,761,012 B2
(45) Date of Patent: Jun. 24, 2014

(54) PACKET RELAY APPARATUS AND METHOD OF RELAYING PACKET

(75) Inventors: Takahiro Yamada, Yokohama (JP); Hideki Hinosugi, Tokyo (JP)

(73) Assignee: Alaxala Networks Corporation, Kawasaki (JP)

( * ) Notice: Subject to any disclaimer, the term of this patent is extended or adjusted under 35 U.S.C. 154(b) by 152 days.

(21) Appl. No.: 13/008,611

(22) Filed: Jan. 18, 2011

(65) Prior Publication Data

US 2011/0176554 A1    Jul. 21, 2011

(30) Foreign Application Priority Data

Jan. 21, 2010  (JP) .................................. 2010-011037

(51) Int. Cl.

| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/50 | (2006.01) |
| H04Q 11/00 | (2006.01) |
| H04L 12/28 | (2006.01) |
| G06F 15/16 | (2006.01) |
| G06F 15/173 | (2006.01) |
| G06F 3/00 | (2006.01) |
| G06F 5/00 | (2006.01) |

(52) U.S. Cl.
USPC ........... 370/231; 370/235; 370/252; 370/388; 370/412; 709/232; 709/238; 710/29; 710/52

(58) Field of Classification Search
USPC .......... 370/231, 252, 235, 412, 388; 709/232, 709/238; 710/29, 52
See application file for complete search history.

(56) References Cited

U.S. PATENT DOCUMENTS

| 6,144,636 A | 11/2000 | Aimoto et al. |
| 6,252,848 B1 | 6/2001 | Skirmont |
| 2001/0007560 A1 | 7/2001 | Masuda |

(Continued)

FOREIGN PATENT DOCUMENTS

| JP | 9-93262 | 4/1997 |
| JP | 10-173661 | 6/1998 |

(Continued)

OTHER PUBLICATIONS

English translation of Japan Patent Office action on application No. 2010-011037, mailed Jan. 29, 2013.

*Primary Examiner* — Alpus H Hsu
*Assistant Examiner* — Yee Lam
(74) *Attorney, Agent, or Firm* — Foley & Lardner LLP (57) ABSTRACT

The packet relay apparatus is provided. The packet relay apparatus includes a receiver that receives a packet; and a determiner that determines to drop the received packet without storing the received packet into a queue among the multi-stage queue. The determiner determines to drop the received packet at a latter stage, based on former-stage queue information representing a state of a queue at any former stage which the received packet belongs to and latter-stage queue information representing a state of a queue at the latter stage which the received packet belongs to.

16 Claims, 9 Drawing Sheets

(56) References Cited

U.S. PATENT DOCUMENTS

| | | |
|---|---|---|
| 2003/0016692 A1 | 1/2003 | Thomas |
| 2004/0151114 A1* | 8/2004 | Ruutu .......................... 370/230 |
| 2008/0186918 A1* | 8/2008 | Tinnakornsrisuphap et al. ............................ 370/331 |
| 2010/0061239 A1* | 3/2010 | Godbole et al. .............. 370/235 |
| 2010/0061390 A1* | 3/2010 | Godbole et al. .............. 370/412 |
| 2010/0061391 A1* | 3/2010 | Sindhu et al. ................ 370/412 |

FOREIGN PATENT DOCUMENTS

| | | |
|---|---|---|
| JP | 11-187042 | 7/1999 |
| JP | 2001-197111 A | 7/2001 |
| JP | 2003-023452 | 1/2003 |
| JP | 2003-504900 A | 2/2003 |
| JP | 2004-529528 A | 9/2004 |
| JP | 2006-054711 A | 2/2006 |

* cited by examiner

| Queue No. | MAX_TH$_{(N)}$ | QLEN$_{(N)}$ |
|---|---|---|
| #1 | 50 | 7 |
| #2 | 80 | 14 |
| #3 | 70 | 22 |
| #4 | 100 | 100 |
| #5 | 120 | 5 |
| ... | ... | ... |
| #999 | 70 | 0 |
| #1000 | 60 | 8 |

| Queue No. | MAX_TH$_{(N+1)}$ | MIN_TH$_{(N+1)}$ | MAX_DP | QLEN$_{(N+1)}$ | QAVE |
|---|---|---|---|---|---|
| #1 | 1000 | 500 | 50% | 700 | 700 |

Fig.7B (Drop Probability)=
if {QAVE > MAX_TH} then {100%}
 else if {QAVE < MIN_TH2} then {0%}
 else {(MAX_P + $\alpha$)(QAVE − MIN_TH + $\beta$)/(MAX_TH − MIN_TH + $\beta$)} where MIN_TH2 = MIN_TH − $\beta$

| Queue No. | MAX_TH$_{(N+1)}$ | QLEN$_{(N+1)}$ | TH#1 | TH#2 | TH#3 | TH#4 |
|---|---|---|---|---|---|---|
| #1 | 1000 | 700 | 250 | 500 | 750 | 1000 |

| Queue No. | TRAF$_{(N)}$ |
|---|---|
| #1 | 8 |
| #2 | 14 |
| #3 | 12 |
| #4 | 2 |
| #5 | 10 |
| ... | ... |
| #999 | 49 |
| #1000 | 22 |

PACKET RELAY APPARATUS AND METHOD OF RELAYING PACKET

CROSS-REFERENCE TO RELATED APPLICATIONS

The present application claims priority to Japanese Patent Application No. 2010-011037 filed on Jan. 21, 2010, the disclosure of which is hereby incorporated by reference in its entirety.

BACKGROUND OF THE INVENTION

1. Field of the Invention

The present invention relates to a packet relay apparatus configured to relay a packet and a method of relaying a packet.

2. Description of the Related Art

Extremely heavier communication traffic or an excess communication request significantly exceeding the capacity of a communication relay apparatus may interfere with smooth communication. This is generally called congestion of communication. The congestion occurs in any communication including the today's Internet communication.

The Internet communication generally receives and sends data in units of packets. Switches and routers are typical examples of packet relay apparatuses configured to relay such packets. The packet relay apparatus generally has queues for temporary storage of packets. Each queue works to restrict the occurrence of packet drop in the burst traffic caused by an overlapped arrival of multiple packets between plural flows in communication of the packet relay apparatus. The queue also serves for packet priority control and communication band control to actualize the QoS (Quality of Service).

The communication traffic over the acceptable range of the packet relay apparatus may cause congestion. A network of the Internet basically adopts the best effort network communication scheme. In a typical protocol TCP/IP (Transmission Control Protocol/Internet Protocol) used in the Internet, a packet retransmission scheme between terminals of packet reception and transmission is implemented to maintain the integrity of communication even in data propagation over a quality-unguaranteed network. The packet relay apparatus used on the Internet is subject to packet drop control in order to assure the low-cost and high-speed communication. This packet drop control is of extreme importance.

Tail Drop and RED (Random Early Detection) are typical queue management algorithms for the packet drop control. The Tail Drop algorithm uses a maximum threshold value representing the maximum packet storage capacity set in each queue. When a queue length of a certain queue exceeds its maximum threshold value, the Tail Drop algorithm drops overflowed packets from the certain queue. This control scheme is readily implemented but causes a slow start of packet retransmission by simultaneous packet drop and gives only a poorer throughput than expected under TCP/IP communication.

The other typical algorithm RED uses a minimum threshold value, a maximum threshold value, and a maximum packet drop rate as parameters set in each queue. When a queue length of a certain queue exceeds its minimum threshold value, the RED algorithm drops packets with a drop probability corresponding to the queue length. The incoming packets are gradually dropped with the drop probability corresponding to the queue length until the queue length reaches its maximum threshold value. When the queue length reaches or exceeds the maximum threshold value, packets are overflowed from the certain queue, so that all the overflowed packets are dropped. The RED algorithm has more difficulty in implementation than the Tail Drop algorithm but allows packets to be gradually dropped at a rate corresponding to the queue length. This control scheme avoids the phenomenon of simultaneous packet retransmission under TCP/IP communication and assures execution of the original line performance.

There are some variants proposed for these two packet drop control algorithms, i.e., WTD (Weighted Tail Drop) and WRED (Weighted Random Early Detection). Both the variant algorithms adopt different policies for different applications of packets and set different drop threshold values for the different applications to achieve packet drop control with different priorities. The WTD algorithm sets different maximum threshold values of queue length for different applications of packets. The WRED algorithm sets different minimum threshold values, different maximum threshold values, and different maximum packet drop rates for different applications of packets. Both these variant control schemes are highly functional to enable packet drop control with different priorities set for the respective applications of packets but require rather complicated information management with regard to the respective applications.

Some packet relay apparatuses adopt a multi-stage queue structure. In the packet relay apparatuses adopting the multi-stage queue structure, the maximum queue length of each queue may be designed on the concept of statistical multiplexing effect. The 'statistical multiplexing effect' sets an overall queue length that is less than the sum of the maximum capacities of queue length of respective queues, on the assumption that it is unlikely that all the queues simultaneously have queue lengths filled to their maximum capacities. The scheme without the concept of statistical multiplexing effect requires the memory capacity corresponding to the sum of the maximum capacities of queue length of the respective queues. The scheme on the concept of statistical multiplexing effect, on the other hand, requires a smaller memory capacity, thus attaining the resource saving and reducing the cost and power consumption.

In the multi-stage queue structure of the packet relay apparatus designed on the concept of the statistical multiplexing effect, the maximum length of a queue monitoring the overall buffer memory capacity is shorter than the sum of the maximum capacities of queue length of all queues at a former stage. In this internal configuration, congestion of a queue at the former stage may cause the queue monitoring the overall buffer memory capacity may be overflowed first. For example, in a simple scheme of storing packets in a queue (queuing) if there is still room to the overall buffer memory capacity, accumulation of packets in a specific queue may lead to a packet overflow of a queue at a latter stage. This restrains other queues from using the buffer memory and thereby interferes with smooth communication of the other queues. This is generally recognized as occupancy of the buffer memory by the specific queue.

A technique disclosed in, for example, JPH10-173661A has been proposed to address this issue. When the queue length of the queue monitoring the overall buffer memory capacity exceeds a predetermined rate, this proposed technique shifts the state and performs control to shorten the maximum threshold values of queue length of all the queues by a fixed rate. This shortens the threshold values of the respective queues by a fixed rate. A notice of congestion is sent to a sender connected to a certain queue having a longer queue length than its shortened threshold value. The sender receiving the notice of congestion lowers the communication speed to decrease the number of packets accumulated in the certain queue from the buffer memory. This eliminates the occupancy of the buffer memory by the certain queue and enables the other users to make communication.

The technique disclosed in JPH10-173661A has not, however, been developed on the premise of the today's Internet communication and accordingly has the following operations in application to the Internet-based packet communication. When the threshold values of the respective queues are shortened by a fixed rate, a certain queue with accumulation of a greater number of packets than its shortened threshold value simultaneously drops all incoming packets exceeding the threshold value. The other users failing to make communication by the occupancy of the buffer memory by the certain queue in the communication band are then allowed to make communication.

The user connected to the certain queue having the queue length over its shortened threshold value is, on the other hand, forced to perform simultaneous retransmission of all the dropped packets on a slow start. This significantly lowers the overall throughput of the network. The technique disclosed in JPH10-173661A starts a series of processing in response to detection of congestion of the queue monitoring the overall buffer memory capacity. It is thus highly probable that congestion simultaneously affects all the queues and causes packets to be simultaneously dropped from all the queues. This technique does not actualize flexible drop control for the users having different priorities.

These issues are not restricted to the packet relay apparatuses designed on the concept of the statistical multiplexing effect but are commonly found in diversity of packet relay apparatuses utilizing the multi-stage queue structure.

SUMMARY

An object of the present invention is to provide technology that is able to provide a unique packet drop control in a packet relay apparatus adopting a multi-stage queue structure.

According to an aspect of the present invention, packet relay apparatus is provided. The packet relay apparatus includes a receiver that receives a packet; and a determiner that determines to drop the received packet without storing the received packet into a queue among the multi-stage queue. The determiner determines to drop the received packet at a latter stage, based on former-stage queue information representing a state of a queue at any former stage which the received packet belongs to and latter-stage queue information representing a state of a queue at the latter stage which the received packet belongs to.

The packet relay apparatus according to this aspect of the invention determines whether a received packet is to be dropped or to be not dropped, based on the former-stage queue information and the latter-stage queue information. This arrangement enables drop control by taking into account the state of the queue at any former stage.

According to another aspect of the present invention, the determiner may set a relation of a packet drop probability to the latter-stage queue information based on the former-stage queue information and determine to drop the received packet, based on a drop probability computed from the latter-stage queue information.

The packet relay apparatus according to this aspect of the invention sets the relation of the packet drop probability to the latter-stage queue information, based on the former-stage queue information. This arrangement enables drop control by taking into account the state of the queue at any former stage.

According to another aspect of the present invention, a constant included in a computational expression used for computing the drop probability may be set in response to a user's instruction.

The packet relay apparatus according to this aspect of the invention enables drop control by taking into account the user's instruction.

According to another aspect of the present invention, a computational expression used for computing the drop probability may be set in response to a user's instruction.

The packet relay apparatus according to this aspect of the invention enables drop control by taking into account the user's instruction.

According to another aspect of the present invention, the determiner may classify the received packet into one of plural classes based on the former-stage queue information, and determine to drop the received packet, based on a threshold value set in each of the plural classes and the latter-stage queue information.

The packet relay apparatus according to this aspect of the invention classifies a received packet to one of plural classes based on the former-stage queue information. This arrangement enables drop control by taking into account the state of the queue at any former stage.

According to another aspect of the present invention, the former-stage queue information may include a queue length of the queue at any former stage.

The packet relay apparatus according to this aspect of the invention enables drop control according to the queue length of the queue at any former stage.

According to another aspect of the present invention, the former-stage queue information may include a communication traffic of the queue at any former stage.

The packet relay apparatus according to this aspect of the invention enables drop control according to the communication traffic of the queue at any former stage.

The technique of the invention is not restricted to the packet relay apparatus having any of the configurations and arrangements discussed above but may be actualized by diversity of other applications, for example, a method of relaying a packet, a packet relay system, an integrated circuit for implementing the relevant functions of the method or the apparatus, a computer program product, such as a recording medium, with a program for implementing the relevant functions recorded therein.

DESCRIPTION OF THE PREFERRED EMBODIMENT

Next, aspects of the present invention will be described in the following order on the basis of embodiments:
A. First Embodiment
B. Second Embodiment
C. Third Embodiment
D. Fourth Embodiment
E. Modifications

A. First Embodiment

A1. Apparatus Configuration

Figure 1:
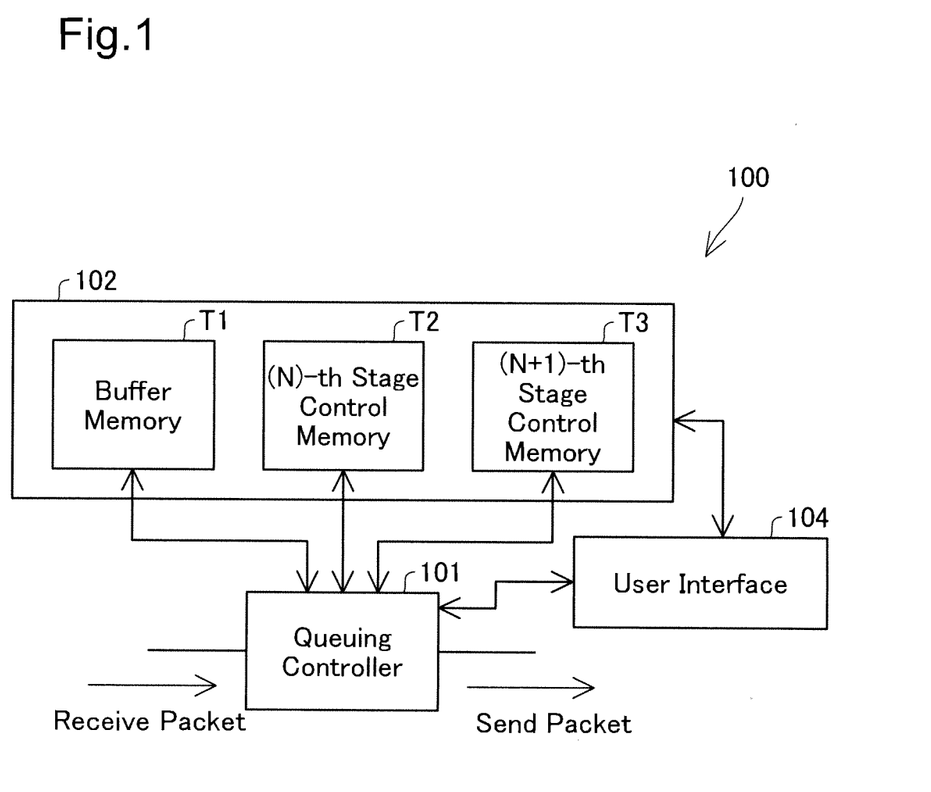
FIG. 1 is an explanatory diagrammatic representation of the configuration of a packet relay apparatus 100 with focusing on its queuing-relevant portion according to one embodiment of the present invention.

FIG. 1 is an explanatory diagrammatic representation of the configuration of a packet relay apparatus 100 with focusing on its queuing-relevant portion according to one embodiment of the present invention. The packet relay apparatus 100 internally has queues at two different stages for packet communication. In the following description of this embodiment, a former stage and a latter stage in the packet relay apparatus 100 are expressed as an (N)-th stage and an (N+1)-th stage.

The packet relay apparatus 100 includes a queuing controller 101 configured to perform queuing control of packets based on control information of the respective queues, a memory group 102 configured to store control information and packets, and a user interface 104. The queuing controller 101 includes a CPU, a ROM, and a RAM (all not shown). The CPU reads and executes a program loaded on the RAM to perform the queuing control. The memory group 102 includes a buffer memory T1 configured to store packet data, an (N)-th stage control memory T2 configured to store control information for (N)-th stage queuing control, and an (N+1)-th stage control memory T3 configured to store control information for (N+1)-th stage queuing control. A display device, such as a display and an input device, such as a keyboard and a mouse are connectable to the user interface 104. A user as an administrator of the packet relay apparatus 100 (hereafter may be referred to as 'administrator user') specifies various settings for the queuing controller 101 and the memory group 102 via the user interface 104.

The packet relay apparatus 100 of the embodiment adopts a buffer-sharing multistage queue structure. The buffer-sharing scheme is based on the concept of statistical multiplexing effect and enables a buffer memory having a capacity of less than the sum of maximum capacities of all queues to be shared by all the queues. The buffer-sharing scheme does not require a buffer memory with a large capacity equal to or greater than the total of the maximum capacities of all the queues and allows for reduction of the required capacity of the buffer memory. Namely the buffer-sharing scheme effectively saves the resource and thereby reduces the cost and the power consumption. In the configuration of this embodiment, the buffer memory T1 serves as a shared buffer.

Figure 2:
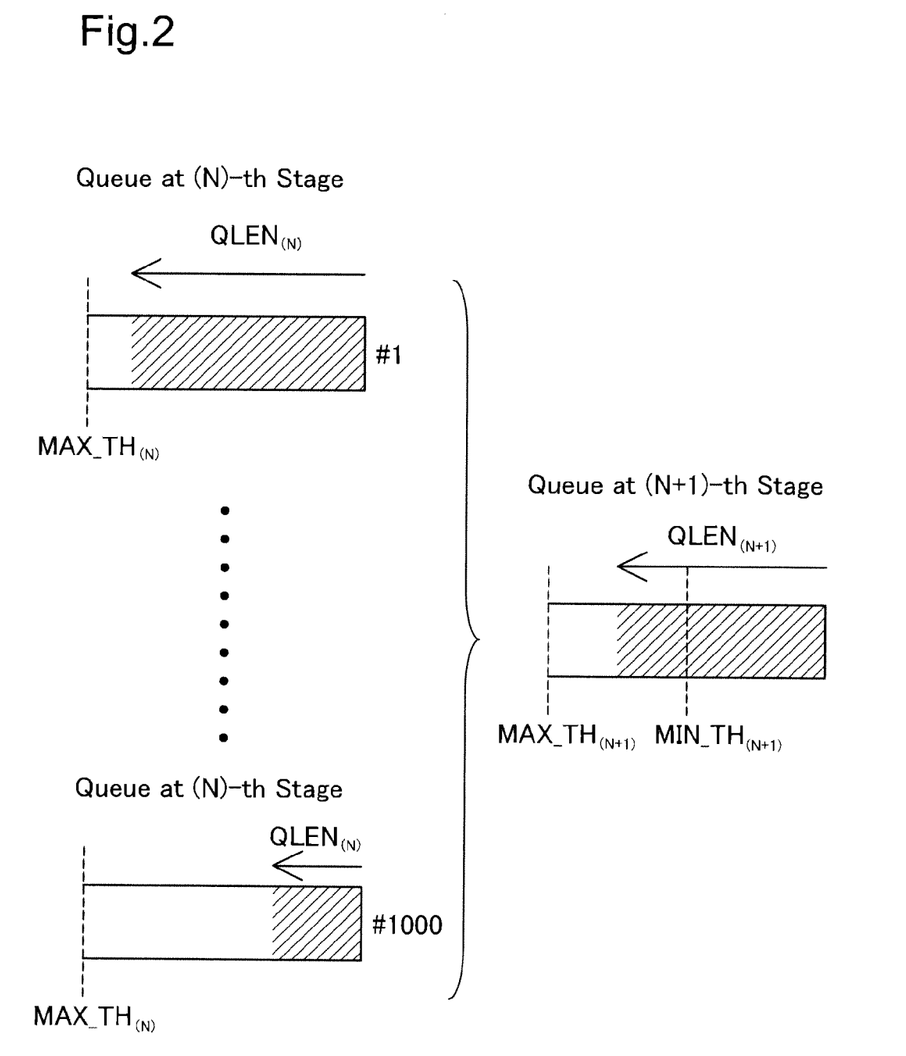
FIG. 2 is a conceptual diagrammatic representation of the multi-stage queue structure.

FIG. 2 is a conceptual diagrammatic representation of the multi-stage queue structure. In the illustrated example of FIG. 2, there are plural queues at the (N)-th stage. Each of the queues at the (N)-th stage is used as an individual queue corresponding to each sender. For example, all packets sent from a user 1 enter a queue #1 at the (N)-th stage. In the buffer-sharing scheme based on the concept of statistical multiplexing effect, a queue at the (N+1)-th stage manages a total number of packets stored respectively in the plural queues at the (N)-th stage. Namely the queue at the (N+1)-th stage has a queue length QLEN(N+1) equal to a sum of queue lengths QLEN(N) of the plural queues at the (N)-th stage in the buffer-sharing scheme. Maximum threshold values MAX_TH(N) of the queues at the (N)-th stage and a maximum threshold value MAX_TH(N+1) and a minimum threshold value MIN_TH(N+1) of the queue at the (N+1)-th stage illustrated in FIG. 2 will be explained later.

Figure 3:
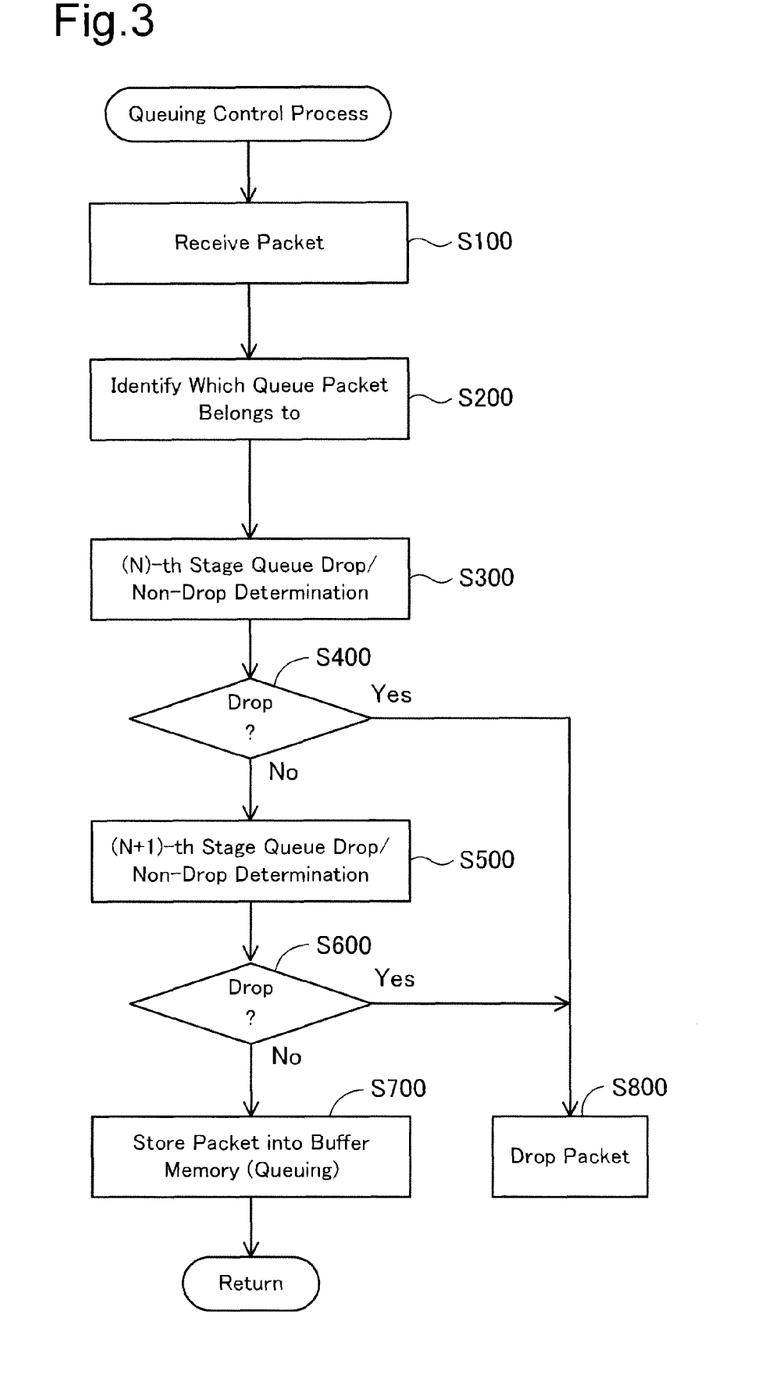
FIG. 3 is a flowchart of a queuing control process performed in the packet relay apparatus 100.

FIG. 3 is a flowchart of a queuing control process performed in the packet relay apparatus 100. When the packet relay apparatus 100 (FIG. 1) receives a packet (step S100), the queuing controller 101 (FIG. 1) identifies which queue among the plural queues at the (N)-th stage the received packet belongs to (step S200). The queuing controller 101 subsequently reads out data stored in the (N)-th stage control memory T2 of the memory group 102 and performs (N)-th stage queue drop/non-drop determination based on the read-out data (step S300), for the purpose of queuing control of the received packet. The details of the (N)-th stage queue drop/non-drop determination will be described later.

On decision of a drop as the result of the (N)-th stage queue drop/non-drop determination (step S400: Yes), the queuing controller 101 drops the received packet (step S800). On decision of non-drop as the result of the (N)-th stage queue drop/non-drop determination (step S400: No), on the other hand, the queuing controller 101 subsequently performs (N+1)-th stage queue drop/non-drop determination (step S500). More specifically, the queuing controller 101 performs the (N+1)-th stage queue drop/non-drop determination, based on the data stored in the (N)-th stage control memory T2 and the (N+1)-th stage control memory T3. The details of the (N+1)-th stage queue drop/non-drop determination will be described later.

On decision of a drop as the result of the (N+1)-th stage queue drop/non-drop determination (step S600: Yes), the queuing controller 101 drops the received packet (step S800). On decision of non-drop as the result of the (N+1)-th stage queue drop/non-drop determination (step S600: No), on the other hand, the queuing controller 101 stores the received packet into the buffer memory T1 (queuing) (step S700).

A2. (N)-th Stage Queue Drop/Non-Drop Determination

Figure 4:
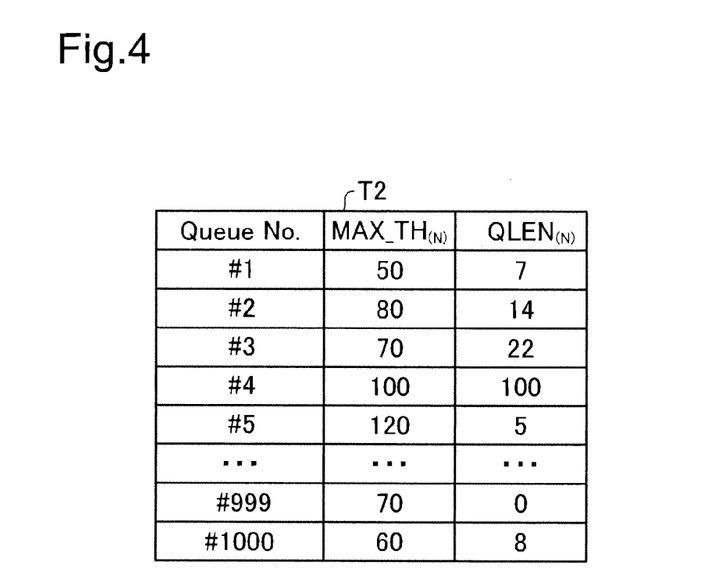
FIG. 4 is an explanatory diagrammatic representation of the control information stored in the (N)-th stage control memory T2.

FIG. 4 is an explanatory diagrammatic representation of the control information stored in the (N)-th stage control memory T2. The (N)-th stage control memory T2 stores maximum threshold values MAX_TH(N) representing maximum capacities of queue length individually set in the plural queues at the (N)-th stage and queue lengths QLEN(N) representing numbers of packets currently stored in the respective queues at the (N)-th stage in correlation to queue numbers #N allocated to the respective queues at the (N)-th stage, as the control information for the (N)-th stage queue drop/non-drop determination.

When the queue length QLEN(N) of the identified queue which the received packet belongs to is less than the maximum threshold value MAX_TH(N), the queuing controller 101 (FIG. 1) makes a decision of non-drop of the received packet as the result of the (N)-th stage queue drop/non-drop determination. When the queue length QLEN(N) of the identified queue which the received packet belongs to is equal to the maximum threshold value MAX_TH(N), on the contrary, the queuing controller 101 (FIG. 1) makes a decision of a drop of the received packet as the result of the (N)-th stage queue drop/non-drop determination. On settlement of non-drop of the received packet from the identified queue at the (N)-th stage as the result of the (N)-th stage queue drop/non-drop determination, the queuing controller 101 subsequently performs the (N+1)-th stage queue drop/non-drop determination explained below.

In the illustrated example of FIG. 4, in a queue with a queue number #4, the queue length QLEN(N) has reached the maximum threshold value MAX_TH(N). The queuing controller 101 accordingly makes a decision of a drop of a received packet from the queue #4. In any of the other queues #N at the (N)-th stage, the queue length QLEN(N) has not yet reached the maximum threshold value MAX_TH(N), so that there is still room to accept some packets. The queuing controller 101 accordingly makes a decision of non-drop of a received packet from any of the other queues #N as the result of the (N)-th stage queue drop/non-drop determination.

The (N)-th stage control memory T2 is updated in the following manner. When a received packet is determined to be not dropped by the (N)-th stage queue drop/non-drop determination and subsequently determined to be not dropped by the (N+1)-th stage queue drop/non-drop determination (described below), the queuing controller 101 stores the received packet into the buffer memory T1 and increments the queue length QLEN(N) of the identified queue by one in the (N)-th stage control memory T2. In the process of transmission of a packet from the buffer memory T1, the queue length QLEN(N) of the identified queue is decremented by one in the (N)-th stage control memory T2.

A3. (N+1)-th Stage Queue Drop/Non-Drop Determination

The queuing controller 101 performs the (N+1)-th stage queue drop/non-drop determination of the received packet, based on the queue length QLEN(N) of the identified queue at the (N)-th stage which the received packet belongs to and the control information stored in the (N+1)-th stage control memory T3. More specifically, in response to the longer queue length QLEN(N) of the identified queue at the (N)-th stage which the received packet belongs to, the queuing controller 101 sets a higher probability for the decision of a drop of the received packet as the result of the (N+1)-th stage queue drop/non-drop determination as described below in detail.

Figure 5:
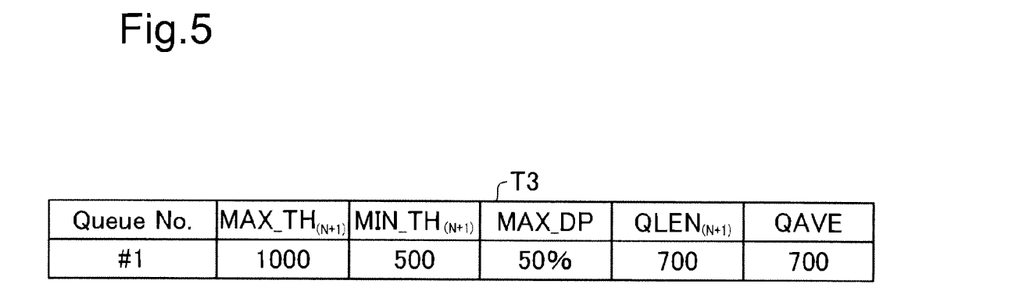
FIG. 5 is an explanatory diagrammatic representation of the control information stored in the (N+1)-th stage control memory T3.

FIG. 5 is an explanatory diagrammatic representation of the control information stored in the (N+1)-th stage control memory T3. The (N+1)-th stage control memory T3 stores a maximum threshold value MAX_TH(N+1) representing a maximum capacity of queue length, a minimum threshold value MIN_TH(N+1) representing a reference queue length for starting a packet drop, a maximum drop probability MAX_DP representing a packet drop probability when the queue length has reached the maximum threshold value MAX_TH(N+1), a queue length QLEN(N+1) representing a total number of packets currently stored in the plural queues at the (N)-th stage, and an average queue length QAVE representing an average value of a time series behavior of the queue length QLEN(N+1), as the control information for the (N+1)-th stage queue drop/non-drop determination. In the illustrated example of FIG. 5, the maximum threshold value MAX_TH(N+1), the minimum threshold value MIN_TH(N+1), the maximum drop probability MAX_DP, the queue length QLEN(N+1), and the average queue length QAVE are respectively equal to 1000, 500, 50%, 700, and 700.

The (N+1)-th stage control memory T3 is updated in the following manner. When a received packet is determined to be not dropped by the (N)-th stage queue drop/non-drop determination and subsequently determined to be not dropped by the (N+1)-th stage queue drop/non-drop determination, the queuing controller 101 transfers the received packet to the memory group 102 to be added to the buffer memory T1. At that moment, the queuing controller 101 increments the queue length QLEN(N+1) by one and updates the average queue length QAVE in the (N+1)-th stage control memory T3. In the process of packet transmission, packets are sequentially read from the buffer memory T1 and are sent via the queuing controller 101. At that moment, the queuing controller 101 decrements the queue length QLEN(N+1) by one and updates the average queue length QAVE in the (N+1)-th stage control memory T3.

Figure 6:
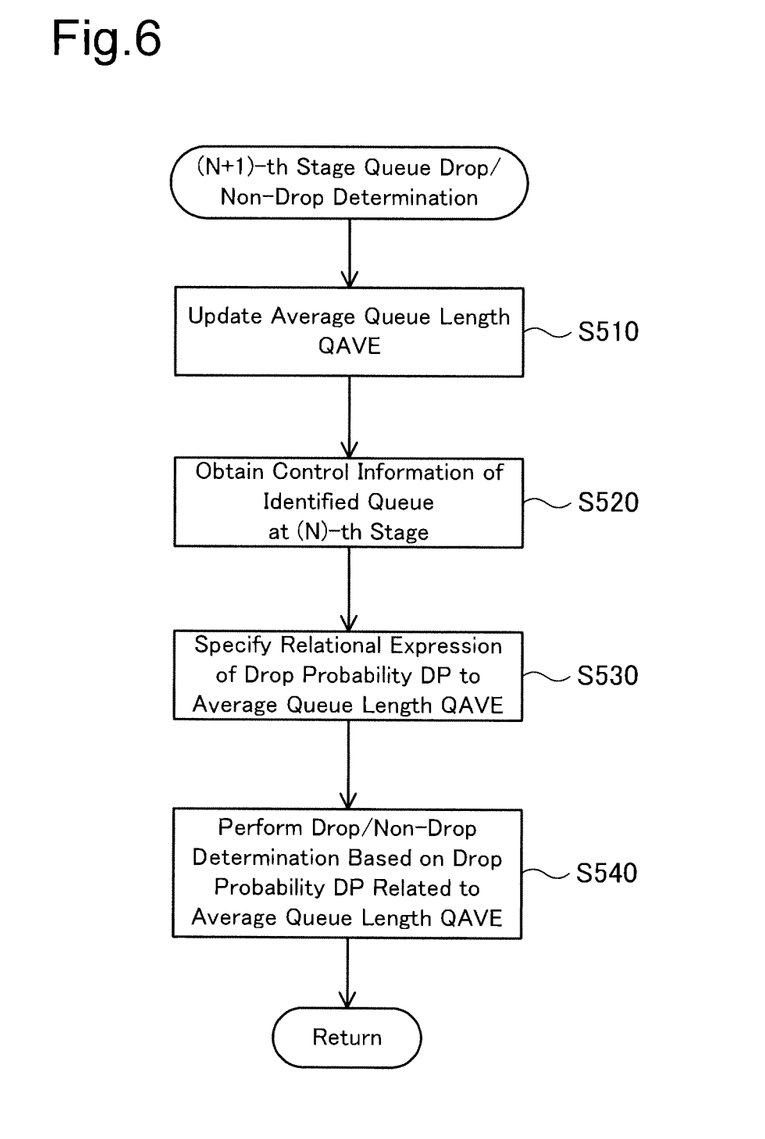
FIG. 6 is a flowchart of the (N+1)-th stage queue drop/non-drop determination.

FIG. 6 is a flowchart of the (N+1)-th stage queue drop/non-drop determination. In response to update of the queue length QLEN(N+1), the queuing controller 101 updates the average queue length QAVE (step S510). An updated average queue length QAVEnew is computed from an updated queue length QLEN(N+1) and a previous average queue length QAVEold according to Equation (1) given below.

$$QAVEnew = \{QLEN(N+1) * 1/2^S\} + \{QAVEold * (1 - 1/2^S)\} \quad (1)$$

where S denotes a weighting factor. As clearly understood from this equation, the greater weighting factor S reduces the effect of the queue length QLEN(N+1) on the updated average queue length QAVEnew. Namely setting a sufficiently large value to the weighting factor S reduces a variation of the average queue length QAVE even when the queue length QLEN(N+1) has a significant change in a short time period.

The queuing controller 101 obtains the control information (the queue length QLEN(N) and the maximum threshold value MAX_TH(N)) of the identified queue at the (N)-th stage which the received packet as the target of drop/non-drop determination belongs to, from the (N)-th stage control memory T2 (step S520).

The queuing controller 101 specifies a relational expression of a drop probability DP to the average queue length QAVE from the obtained queue length QLEN(N) and maximum threshold value MAX_TH(N) of the identified queue at the (N)-th stage (step S530). Namely a different relational expression of the drop probability DP to the average queue length QAVE is specified for each queue at the (N)-th stage as described below in detail. The queuing controller 101 performs packet drop/non-drop determination at the (N+1)-th stage, based on the drop probability DP related to the average queue length QAVE (step S540).

On decision of a drop as the result of the packet drop/non-drop determination based on the drop probability DP related to the average queue length QAVE, the queuing controller 101 drops the received packet (step S800 in FIG. 3). On decision of non-drop, the queuing controller 101 stores the received packet into the buffer memory T1 (queuing) (step S700 in FIG. 3).

Figure 7A:
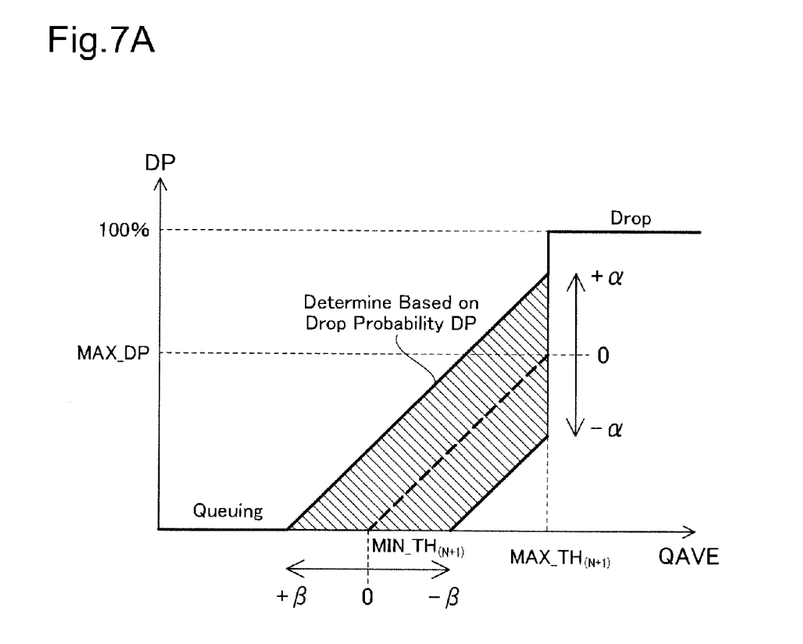
FIG. 7A is an explanatory diagrammatic representation of the relational expression of the drop probability DP to the average queue length QAVE in the form of a graph.

FIG. 7A is an explanatory diagrammatic representation of the relational expression of the drop probability DP to the average queue length QAVE in the form of a graph. As explained above, the queuing controller 101 specifies the drop probability DP related to the average queue length QAVE and performs the packet drop/non-drop determination at the (N+1)-th stage, based on the specified drop probability DP. The relation of the drop probability DP to the average queue length QAVE is given as:

when $QAVE \geq MAX\_TH(N+1)$,

DP=100%, when $QAVE \leq MIN\_TH(N+1)-\beta$,

DP=0%, and when $MIN\_TH(N+1)-\beta < QAVE < MAX\_TH(N+1)$,

DP=(MAX_DP+α)(QAVE−MIN_TH(N+1)+β)/
(MAX_TH(N+1)−MIN_TH(N+1)+β)

where α denotes a drop probability weight and β denotes a drop threshold weight.

As shown in FIG. 7A, when the drop probability weight α is a positive value, an increase in absolute value of the drop probability weight a causes the drop probability DP to have a greater increase from the maximum drop probability MAX_DP under the condition that the average queue length QAVE is equal to the maximum threshold value MAX_TH (N+1). When the drop probability weight α is a negative value, on the other hand, an increase in absolute value of the drop probability weight a causes the drop probability DP to have a greater decrease from the maximum drop probability MAX_DP under the condition that the average queue length QAVE is equal to the maximum threshold value MAX_TH (N+1).

When the drop threshold weight β is a positive value, an increase in absolute value of the drop threshold weight f3 causes a threshold value for starting packet drop to have a greater decrease from the minimum threshold value MIN_TH (N+1). When the drop threshold weight β is a negative value, on the other hand, an increase in absolute value of the drop threshold weight β causes the threshold value for starting packet drop to have a greater increase from the minimum threshold value MIN_TH(N+1). Namely the relation between the drop probability DP of a packet determined to be dropped and the average queue length QAVE varies with variations of the drop probability weight α and the drop threshold weight β.

The drop probability weight α and the drop threshold weight β are respectively computed from the queue length QLEN(N) and the maximum threshold value MAX_TH(N) of the identified queue at the (N)-th stage which the received packet as the target of drop/non-drop determination belongs to, according to Equations (2) and (3) given below:

α=αMAX*{QLEN(N)/MAX_TH(N)*2−1}  (2)

β=βMAX*{QLEN(N)/MAX_TH(N)*2−1}  (3)

where αMAX and βMAX denote preset constants.

The relation of the drop probability DP to the average queue length QAVE is varied according to the state of the identified queue at the (N)-th stage which the received packet as the target of drop/non-drop determination belongs to. More specifically, a greater ratio of the queue length QLEN(N) to the maximum threshold value MAX_TH(N) of the identified queue at the (N)-th stage, which the received packet belongs to, increases the drop probability weight α and the drop threshold weight β and thereby increases the drop probability DP of the received packet in the queue at the (N+1)-th stage.

The administrator user may set desired values to the constants αMAX and βMAX through the operations of the input device connected to the user interface 104. The administrator user can thus freely set and change the variation ranges of the drop probability weight α and the drop threshold weight β. For example, the administrator user may adequately adjust the variation ranges of the drop probability weight α and the drop threshold weight β according to the number of users connected to the packet relay apparatus 100 and the communication traffic. Alternatively the administrator user may select adequate values for the constants αMAX and βMAX among plural pre-adjusted values.

A concrete example of computing the drop probability DP is explained. It is here assumed that the control information stored in the (N+1)-th stage control memory T3 has the settings shown in FIG. 5, i.e., the maximum threshold value MAX_TH(N+1), the minimum threshold value MIN_TH(N+1), the maximum drop probability MAX_DP, the queue length QLEN(N+1), and the average queue length QAVE respectively equal to 1000, 500, 50%, 700, and 700 and that the constants αMAX and βMAX are set equal to 40% and 400.

In one example, when the queue length QLEN(N) of an identified queue at the (N)-th stage, which a packet belongs to, is ¾ of the maximum threshold value MAX_TH(N), the drop probability weight α and the drop threshold weight β are respectively equal to 20% and 200. Since the average queue length QAVE of the queue at the (N+1)-th stage is equal to 700, the drop probability DP of this packet at the (N+1)-th stage is 40%. Namely this packet is determined to be dropped and is actually dropped with the probability of 40%. When the packet is determined to be not dropped, the queuing controller 101 transfers the packet to the memory group 102 to be stored in the buffer memory T1. Random numbers are used for the packet drop/non-drop determination based on the drop probability DP.

In another example, when the queue length QLEN(N) of an identified queue at the (N)-th stage, which a packet belongs to, is ¼ of the maximum threshold value MAX_TH(N), the drop probability weight α and the drop threshold weight β are respectively equal to −20% and −200. Since the average queue length QAVE of the queue at the (N+1)-th stage is equal to 700, the drop probability DP of this packet at the (N+1)-th stage is 0%. In this case, the packet is determined to be not dropped and is transferred from the queuing controller 101 to the memory group 102 to be stored in the buffer memory T1.

Figure 7B:
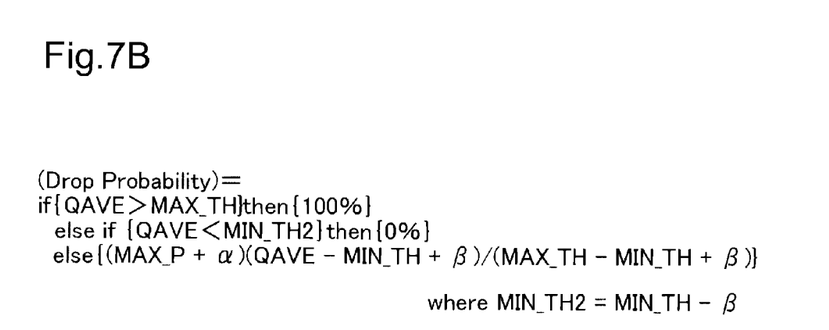
FIG. 7B is an explanatory diagrammatic representation of a conditional expression used for the (N+1)-th stage queue drop/non-drop determination.

FIG. 7B is an explanatory diagrammatic representation of a conditional expression used for the (N+1)-th stage queue drop/non-drop determination. The queuing controller 101 compares the updated average queue length QAVE with the maximum threshold value MAX_TH(N+1). When the average queue length QAVE is not less than the maximum threshold value MAX_TH(N+1), the queuing controller 101 drops the packet. When the average queue length QAVE is less than the maximum threshold value MAX_TH(N+1), on the other hand, the queuing controller 101 subsequently compares the average queue length QAVE with a corrected minimum threshold value MIN_TH2(N+1) (=MIN_TH(N+1)−β. When the average queue length QAVE is not greater than the corrected minimum threshold value MIN_TH2(N+1), the queuing controller 101 stores the packet into the buffer memory T1

(queuing). When the average queue length QAVE is less than the maximum threshold value MAX_TH(N+1) but is greater than the corrected minimum threshold value MIN_TH2(N+1), the queuing controller 101 performs the packet drop/non-drop determination, based on the drop probability DP specified according to the average queue length QAVE.

As explained above, the packet drop/non-drop determination of the embodiment increases the drop probability DP of a packet in a specific queue at the (N)-th stage that has a greater occupancy in the buffer memory T1 and selectively drops the packet from this specific queue. This advantageous characteristic is explained more with reference to a comparative example.

Figure 8:
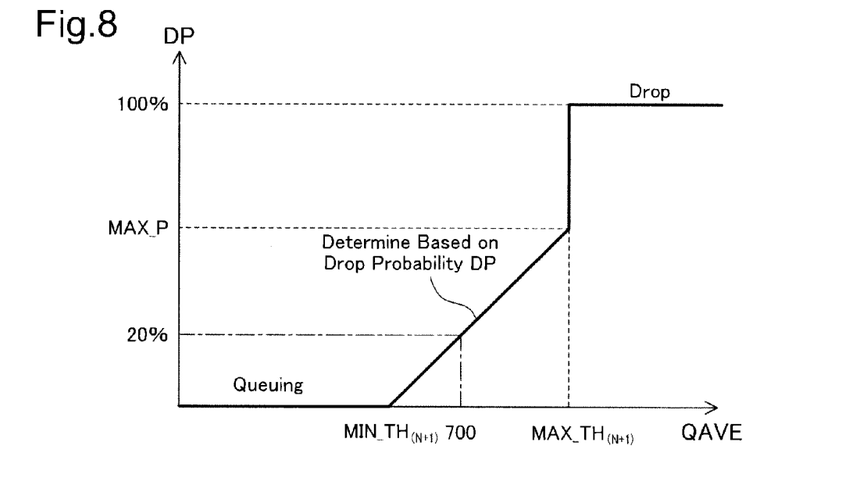
FIG. 8 is an explanatory diagrammatic representation of RED-based drop/non-drop determination of a packet in the form of a graph as a comparative example.

FIG. 8 is an explanatory diagrammatic representation of RED-based drop/non-drop determination of a packet in the form of a graph as a comparative example. The RED-based relation of the drop probability DP of a packet to the average queue length QAVE of the comparative example is given as:

when $QAVE > MAX\_TH(N+1)$, $DP = 100\%$, when $QAVE < MIN\_TH(N+1)$, $DP = 0\%$, and when $MIN\_TH(N+1) QAVE < MAX\_TH(N+1)$, $DP = (MAX\_DP)(QAVE - MIN\_TH(N+1))/(MAX\_TH(N+1) - MIN\_TH(N+1))$ The primary difference from the relation of the embodiment described above is no inclusion of the drop probability weight α and the drop threshold weight β.

It is here assumed that the control information stored in the (N+1)-th stage control memory T3 has the settings shown in FIG. 5. In the illustrated example of FIG. 5, since the average queue length QAVE is equal to 700, the drop probability DP of a packet is 20%. Namely the packet is determined to be chopped with the probability of 20%, while being determined to be not dropped with the probability of 80%.

The RED scheme drops a packet, based on the drop probability DP specified according to the average queue length QAVE of the queue at the (N+1)-th stage, so as to prevent simultaneous drop of packets due to an overflow of the queue. Application of the RED scheme to the queue at the (N+1)-th stage can thus lower the probability of simultaneous drop of packets due to an overflow of the queue at the (N+1)-th stage. The RED scheme of this comparative example, however, does not identify which queue at the former stage the packet as the target of drop/non-drop determination belongs to. It is thus difficult to restrict the occupancy of a specific queue in the buffer memory T1.

On the other hand, the scheme of this embodiment may increase the drop probability DP of a packet in a specific queue at the (N)-th stage having a greater occupancy in the buffer memory T1 and selectively drop the packet as explained above.

Namely the scheme of the embodiment increases the drop probability DP of a packet in a specific queue having a larger number of packets stored in the buffer memory T1 among the plural queues at the (N)-th stage, while decreasing the drop probability DP of a packet in any other queue having a smaller number of packets stored in the buffer memory T1. This arrangement effectively lowers the high occupancy of the specific queue in the buffer memory T1.

The scheme of this embodiment increases the drop probability DP with an increase in queue length QLEN(N) at the (N)-th stage. This assures the effects equivalent to those in implementation of the RED scheme in all the queues at the (N)-th stage, while requiring an extremely smaller implementation area than implementation of the RED scheme in all the queues at the (N)-th stage, thus reducing the cost and the power consumption. The scheme of this embodiment restricts the occupancy of any specific queue in the buffer memory and thereby prevents the potential communication failure due to the unavailability of the buffer memory for the other queues.

B. Second Embodiment

Figure 9:
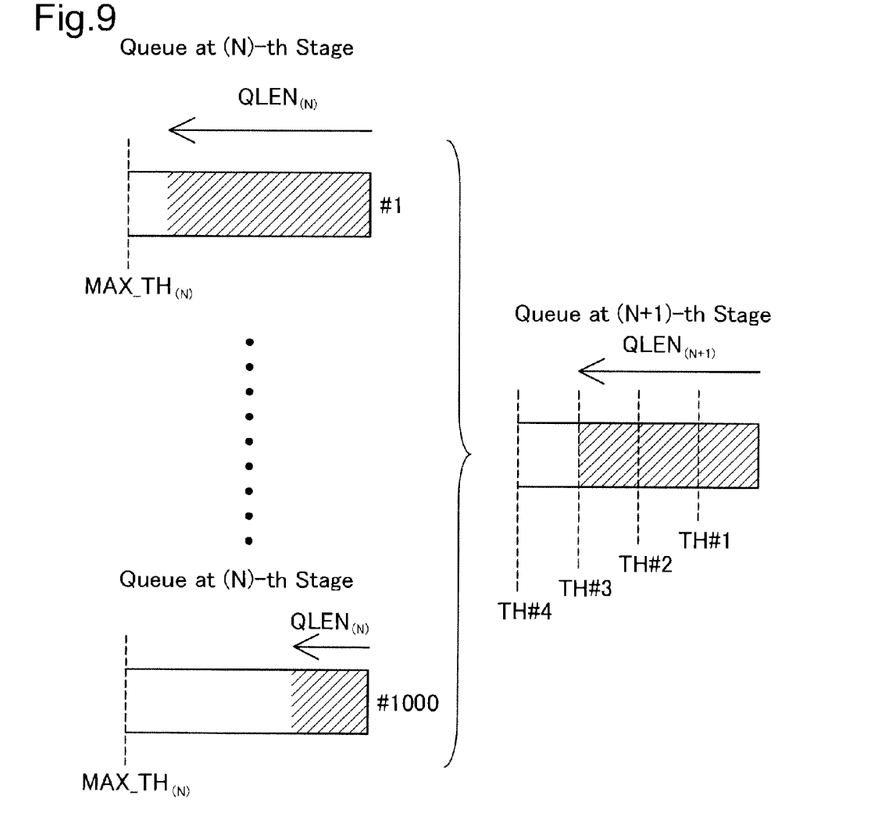
FIG. 9 is a conceptual diagrammatic representation of a multi-stage queue structure in a second embodiment.

FIG. 9 is a conceptual diagrammatic representation of a multi-stage queue structure in a second embodiment. The difference from the multi-stage queue structure of the first embodiment described above is only drop classes adopted for the (N+1)-th stage queue drop/non-drop determination. The apparatus configuration and the processing flow of the (N)-th stage queue drop/non-drop determination are identical with those of the first embodiment. The drop classes are used to classify packets by the priority and are set to have different priorities.

In this embodiment, the queuing controller 101 classifies each packet into one of four drop classes, based on the state of an identified queue at the (N)-th stage which the packet belongs to. The queuing controller 101 then makes packets classified into a drop class with the higher priority unlikely to be dropped, compared with packets classified into a drop class with the lower priority. More specifically, the queuing controller 101 specifies a drop class of each received packet according to the queue length QLEN(N) of an identified queue at the (N)-th stage which the received packet belongs to. In the specification hereof, the terminology of 'higher priority' means that a packet is unlikely to be dropped, and the terminology of 'lower priority' means that a packet is preferentially dropped.

In the illustrated example of FIG. 9, a queue #1000 at the (N)-th stage has a relatively short queue length QLEN(N), so that the queuing controller 101 classifies packets belonging to the queue #1000 at the (N)-th stage into a drop class #4 with the higher priority. A queue #1 at the (N)-th stage has a relatively long queue length QLEN(N), so that the queuing controller 101 classifies packets belonging to the queue #1 at the (N)-th stage into a drop class #2 with the lower priority. Namely a packet belonging to a queue having a relatively long queue length QLEN(N) at the (N)-th stage is classified into a drop class with the lower priority and is thus likely to be dropped as the result of the (N+1)-th stage queue drop/non-drop determination. This scheme effectively restricts the occupancy of a specific queue having a long queue length QLEN(N) in the buffer memory T1.

In this embodiment, different drop threshold values are set in the respective drop classes for packet classification. In the illustrated example of FIG. 9, four different drop threshold values TH#1 to TH#4 are set in the four drop classes. Among the four drop threshold values TH#1 to TH#4, a greater value is set in a drop class with the higher priority.

Figure 10:
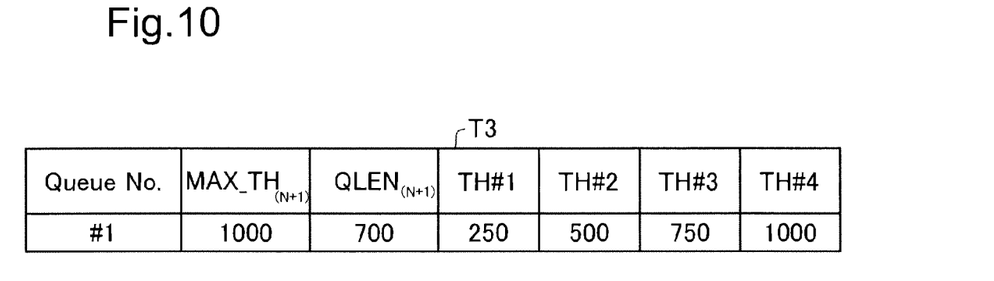
FIG. 10 is an explanatory diagrammatic representation of the control information stored in the (N+1)-th stage control memory T3 in the second embodiment.

FIG. 10 is an explanatory diagrammatic representation of the control information stored in the (N+1)-th stage control memory T3 in the second embodiment. The (N+1)-th stage control memory T3 of the second embodiment stores the maximum threshold value MAX_TH(N+1) representing the maximum capacity of queue length, the queue length QLEN(N+1) representing the total number of packets currently stored in the plural queues at the (N)-th stage, and the four drop threshold values TH#1 to TH#4 set in the respective drop classes, as the control information for the (N+1)-th stage queue drop/non-drop determination.

In the (N+1)-th stage queue drop/non-drop determination, the queuing controller 101 compares the queue length QLEN (N+1) with a drop threshold value set in a specific drop class which a packet as the target of drop/non-drop determination is classified into. When the queue length QLEN(N+1) is not less than the drop threshold value, the queuing controller 101 determines the packet to be dropped. When the queue length QLEN(N+1) is less than the drop threshold value, on the other hand, the queuing controller 101 determines the packet to be not dropped.

The scheme of the second embodiment specifies a drop class of a packet according to the queue length QLEN(N) of an identified queue at the (N)-th stage which the packet belongs to, and performs the packet drop/non-drop determination based on the drop threshold value set in the specified drop class. The scheme of this embodiment effectively restricts the occupancy of a specific queue having a long queue length QLEN(N) in the buffer memory T1 and thereby prevents the potential communication failure due to the unavailability of the buffer memory T1 for the other queues.

One preferable application allows the administrator user to adequately set and change the drop threshold values TH#1 to TH#4, the classification method of packets into plural drop classes, and the number of drop classes. This application assures detailed drop control according to the number of users connected to the packet relay apparatus 100 and the communication traffic.

C. Third Embodiment

Figure 11:
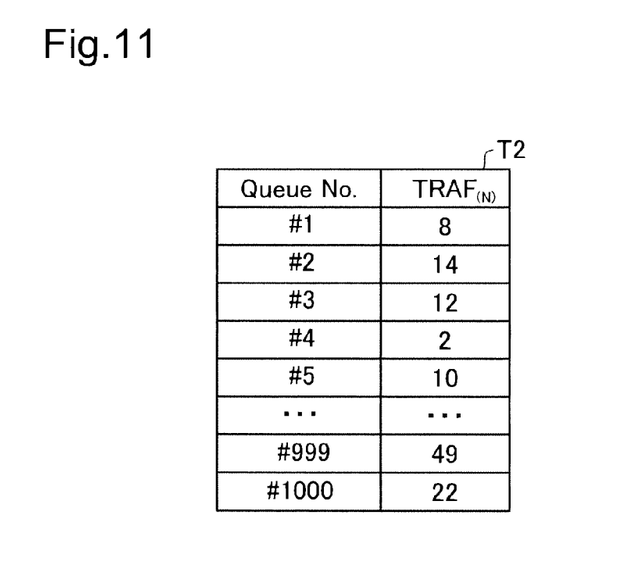
FIG. 11 is an explanatory diagrammatic representation of the control information stored in the (N)-th stage control memory T2 in a third embodiment.

FIG. 11 is an explanatory diagrammatic representation of the control information stored in the (N)-th stage control memory T2 in a third embodiment. In the first and the second embodiments discussed above, the queuing controller 101 uses the queue length QLEN(N) of an identified queue at the (N)-th stage for computation of the drop probability DP and specification of a drop class. Alternatively the queuing controller 101 may measure communication traffic TRAF(N) of an identified queue at the (N)-th stage and use the measured communication traffic TRAF(N) as the control information for the (N+1)-th stage queue drop/non-drop determination. More specifically, the queuing controller 101 may compute the drop probability DP or specify the drop class in order to increase the preference of decision of a drop for a packet belonging to a queue with heavy communication traffic TRAF by the (N+1)-th stage queue drop/non-drop determination. This scheme also enables the (N+1)-th stage queue drop/non-drop determination to be adequately performed by taking into account the state of the indentified queue at the (N)-th stage. The queuing controller 101 may compute the drop probability DP or specify the drop class, based on the control information including both the communication traffic TRAF(N) and the queue length QLEN(N) of the identified queue at the (N)-th stage.

D. Fourth Embodiment

Figure 12:
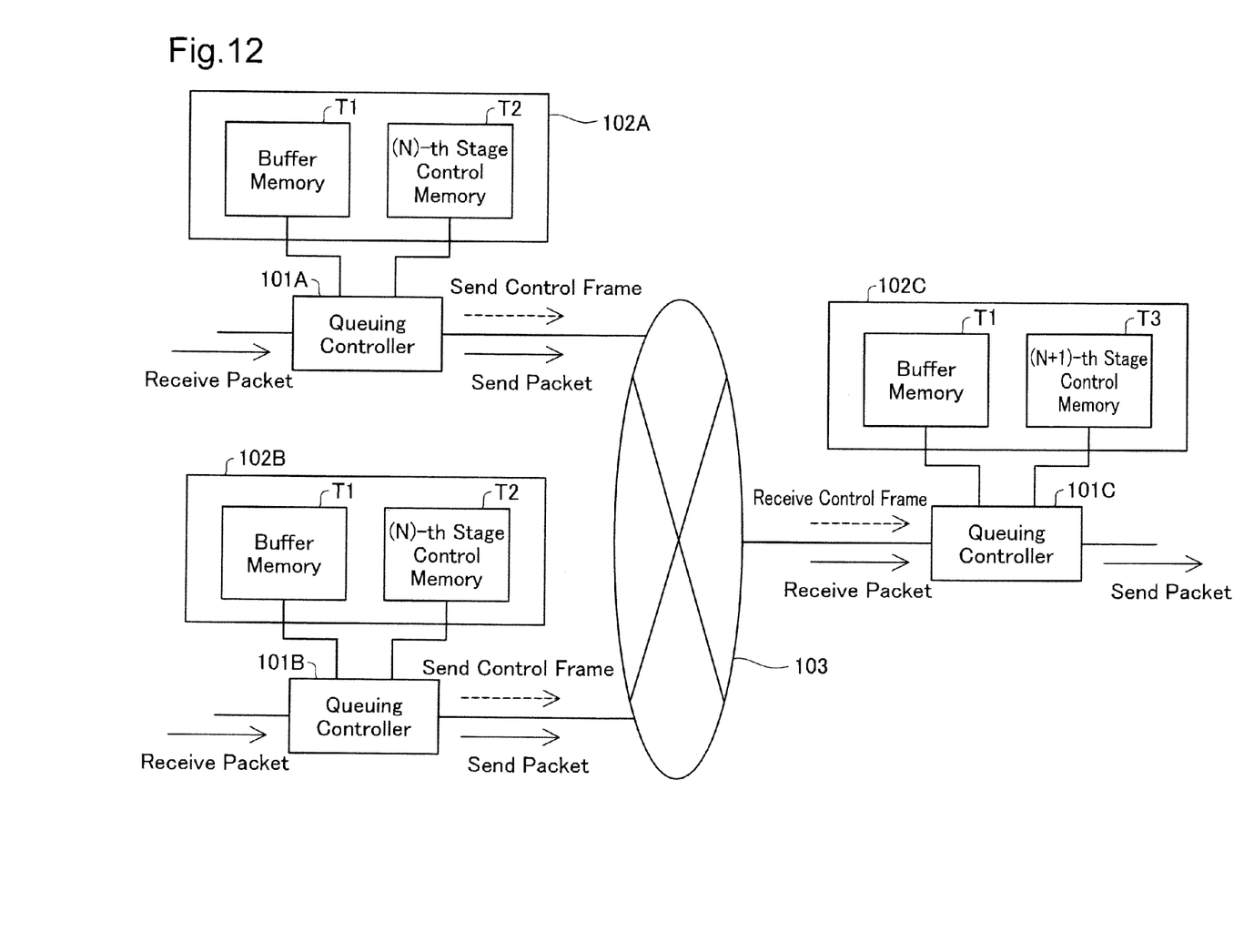
FIG. 12 is an explanatory diagrammatic representation of the configuration of another packet relay apparatus including individual buffer memories for respective queues according to a fourth embodiment of the invention.

FIG. 12 is an explanatory diagrammatic representation of the configuration of another packet relay apparatus including individual buffer memories for respective queues according to a fourth embodiment of the invention. The fourth embodiment adopts an individual buffer scheme using physically separate buffers. Each of memory groups 102A and 102B for queues at the (N)-th stage includes a buffer memory T1 and an (N)-th stage control memory T2. A memory group 102C for a queue at the (N+1)-th stage includes a buffer memory T1 and an (N+1)-th stage control memory T3. In this embodiment, in the process of drop control for the queue at the (N+1)-th stage, (N)-th stage queuing controllers 101A and 101B send control information of the queues at the (N)-th stage stored in the (N)-th stage control memories T2 to a queuing controller 101C. This enables a similar series of drop control to the drop control on the buffer-sharing scheme of the first embodiment described above.

The drop control on the individual buffer scheme is explained. The packet relay apparatus receives a packet and identifies which queue the received packet belongs to. The queuing controller 101 corresponding to an identified queue at the (N)-th stage which the received packet belongs to reads out a maximum threshold value MAX_TH(N) representing a maximum capacity of queue length and a queue length QLEN (N) representing a number of packets currently stored in the buffer memory T1 from the (N)-th stage control memory T2 of the corresponding memory group 102, and performs drop/non-drop determination of the received packet. On decision of a drop, the received packet is dropped. On decision of non-drop, the received packet is written into the buffer memory T1 of the corresponding memory group 102. The queue length QLEN(N) stored in the corresponding (N)-th stage control memory T2 is then incremented by one.

An adjuster 103 sequentially sends packets stored in the queues at the (N)-th stage. When the packet stored in the identified queue at the (N)-th stage is to be sent, the adjuster 103 reads out packet data from the corresponding buffer memory T1 and sends the queue length QLEN(N) as the control information of the identified queue at the (N)-th stage, together with the packet data, to the queue at the (N+1)-th stage. At that moment, the queue length QLEN(N) stored in the corresponding (N)-th stage control memory T2 is decremented by one. When the queue at the (N+1)-th stage receives the packet, the queuing controller 101C refers to the control information read from the (N+1)-th stage control memory T3 of the memory group 102C at the (N+1)-th stage and the queue length QLEN(N) of the identified queue at the (N)-th stage received from the identified queue at the (N)-th stage and performs the (N+1)-th stage queue drop/non-drop determination. The individual buffer scheme of this embodiment also enables the (N+1)-th stage queue drop/non-drop determination to be adequately performed by taking into account the state of the identified queue at the (N)-th stage.

The methods of the (N+1)-th stage queue drop/non-drop determination adopted in the second embodiment and the third embodiment described above are also applicable to the individual buffer scheme of the fourth embodiment.

E. Modifications

The invention is not limited to any of the embodiments and their applications discussed above but may be actualized in diversity of other embodiments and applications within the scope of the invention. Some examples of possible modification are given below.

Modification 1

Any of the above embodiments describe the two-stage queue structure. The technique of the present invention is similarly applicable to a three-stage or a greater number of stage queue structure. The queuing controller 101 performs packet drop/non-drop determination in a queue at each stage, based on control information of the queue at the stage and control information of a queue at any former stage.

Modification 2

In the configuration of the first embodiment described above, the queuing controller 101 identifies which queue, among the plural queues at the (N)-th stage, a packet received by the packet relay apparatus 100 belongs to. A different device separate from the packet relay apparatus 100 may alternatively perform such identification.

Modification 3

The equation used for computing the drop probability DP and the equations for computing the drop probability weight $\alpha$ and the drop threshold weight $\beta$ shown in the description of the first embodiment are only illustrative and may be replaced by any other adequate equations including the control information of the identified queue at the (N)-th stage as the parameters. The equation used for computing the drop probability DP and the equations for computing the drop probability weight $\alpha$ and the drop threshold weight $\beta$, the constants included in these equations, and the drop threshold values TH set in the respective drop classes (second embodiment) may be set and changed by the administrator user's instruction via the user interface 104 or may alternatively be selected among plural options provided in advance. This arrangement enables the packet drop/non-drop determination to be adequately adjusted according to the number of users and a variation in communication traffic.

Modification 4

The second embodiment uses the four drop classes. The number of drop classes is, however, not restricted to four but may be any number greater than or less than four.

Modification 5

In the second embodiment described above, the queuing controller 101 classifies a packet belonging to a queue having the longer queue length QLEN(N) at the (N)-th stage into a drop class with the lower priority. Alternatively the packet belonging to the queue having the longer queue length QLEN(N) at the (N)-th stage may be classified into a drop class with the higher priority. In the case where there is the possibility of overflow of a specific queue at the (N)-th stage due to accumulation of packets but there is still room in the queue at the (N+1)-th stage having some physical connection with the specific queue at the (N)-th stage, even setting the higher priority of packets (unlikely to be dropped) to the specific queue at the (N)-th stage having the possibility of overflow prevents the potential overflow of the specific queue at the (N)-th stage.

Modification 6

In the configurations of the above embodiments, the display device, such as the display and the input device, such as the keyboard are connectable to the user interface 104. Alternatively a display unit or an input unit may be provided on the main body of the packet relay apparatus 100. The packet relay apparatus 100 may be designed to have a simple server function of receiving and accepting a request via a network, in place of the user interface 104, in order to allow another computer connecting with the network to set the equation used for computing the drop probability DP and the constants such as $\alpha$MAX and $\beta$MAX.

Modification 7

Part or all of the functions implemented by the software configuration in the above embodiments may be accomplished by the hardware configuration. Part or all of the structures and the functions actualized by the hardware configuration in the above embodiments may be accomplished by the software configuration.

What is claimed is:

1. A packet relay apparatus configured to relay a packet by utilizing a multi-stage queue structure, comprising:
    a receiver configured to receive a packet;
    a determiner configured to determine whether to drop the received packet at a latter stage, based on former-stage queue information representing a state of a former-stage queue at any former stage to which the received packet belongs, and latter-stage queue information including a drop probability and representing a state of a latter-stage queue at the latter stage to which the received packet belongs;
    a buffer memory configured to hold the received packet on the basis of the determination by the determiner; and
    a queuing controller configured to queue the received packet into the former-stage queue or the latter-stage queue in the buffer memory if the determiner determines not to drop the received packet,
    wherein when an average queue length is less than a maximum threshold value and greater than a minimum threshold value which is decreased by a drop threshold weight, the drop probability DP is defined as $$DP=(MAX\_DP+\beta)(QAVE-MIN\_TH(N+1)+\beta)/(MAX\_TH(N+1)-MIN\_TH(N+1)+\beta),$$

wherein MAX_DP is a maximum drop probability, $\alpha$ is the drop probability weight, $\beta$ is the drop threshold weight, QAVE is the average queue length, MAX_TH(N+1) is the maximum threshold value, and MIN_TH(N+1) is the minimum threshold value.

2. The packet relay apparatus according to claim 1, wherein the determiner is further configured to:
    set a relation of the drop probability to the latter-stage queue information based on the former-stage queue information; and
    determine whether to drop the received packet, based on the drop probability computed from the latter-stage queue information.

3. The packet relay apparatus according to claim 2, wherein a constant included in a computational expression used for computing the drop probability is set in response to a user's instruction.

4. The packet relay apparatus according to claim 2, wherein a computational expression used for computing the drop probability is set in response to a user's instruction.

5. The packet relay apparatus according to claim 1, wherein the determiner is further configured to:
    classify the received packet into one of plural classes based on the former-stage queue information; and
    determine whether to drop the received packet based on a threshold value set in each of the plural classes and the latter-stage queue information.

6. The packet relay apparatus according to claim 1, wherein the former-stage queue information includes a queue length of the queue at any former stage.

7. The packet relay apparatus according to claim 1, wherein the former-stage queue information includes a communication traffic of the queue at any former stage.

8. A method of relaying a packet by utilizing a multi-stage queue structure, comprising:
   (a) receiving a packet;
   (b) determining whether to drop the received packet at a latter stage, based on former-stage queue information representing a state of a former-stage queue at any former stage to which the received packet belongs and latter-stage queue information including a drop probability and representing a state of a latter-stage queue at the latter stage to which the received packet belongs;
   (c) holding the received packet in a buffer memory on the basis of the determination by the determiner; and
   (d) queuing the received packet into the former-stage queue or the latter-stage queue in the buffer memory if it is determined that the received packet will not be dropped,
   wherein when an average queue length is less than a maximum threshold value and greater than a minimum threshold value which is decreased by a drop threshold weight, the drop probability DP is defined as $$DP=(MAX\_DP+\alpha)(QAVE-MIN\_TH(N+1)+\beta)/(MAX\_TH(N+1)-MIN\_TH(N+1)+\beta),$$

wherein MAX_DP is a maximum drop probability, $\alpha$ is the drop probability weight, $\beta$ is the drop threshold weight, QAVE is the average queue length, MAX_TH(N+1) is the maximum threshold value, and MIN_TH(N+1) is the minimum threshold value.

9. The method according to claim 8, further comprising:
   setting a relation of the drop probability to the latter-stage queue information based on the former-stage queue information;
   wherein determining whether to drop the received packet is further based on the drop probability computed from the latter-stage queue information.

10. The method according to claim 9, wherein a constant included in a computational expression used for computing the drop probability is set in response to a user's instruction.

11. The method according to claim 9, wherein a computational expression used for computing the drop probability is set in response to a user's instruction.

12. The method according to claim 8, further comprising:
   classifying the received packet into one of plural classes based on the former-stage queue information;
   wherein determining whether to drop the received packet is further based on a threshold value set in each of the plural classes and the latter-stage queue information.

13. The method according to claim 8, wherein the former-stage queue information includes a queue length of the queue at any former stage.

14. The method according to claim 8, wherein the former-stage queue information includes a communication traffic of the queue at any former stage.

15. The packet relay apparatus of claim 1, wherein the drop probability is 100% when the average queue length is greater than or equal to the maximum threshold value, and the drop probability is zero when the average queue length is less than or equal to the minimum threshold value decreased by the drop probability weight.

16. The packet relay apparatus of claim 1, wherein the drop probability weight is defined as $\alpha=\alpha MAX*\{QLEN(N)/MAX\_TH(N)*2-1\}$ and the drop threshold weight is defined as $\beta=\beta MAX*\{QLEN(N)/MAX\_TH(N)*2-1\}$.
   wherein $\alpha MAX$ and $\beta MAX$ are preset constands, QLEN (N) is a queue length at any stage.

\* \* \* \* \*